(12) United States Patent
Hoshi

(10) Patent No.: US 10,378,464 B2
(45) Date of Patent: Aug. 13, 2019

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Kenji Hoshi, Gotemba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 31 days.

(21) Appl. No.: 15/884,495

(22) Filed: Jan. 31, 2018

(65) Prior Publication Data

US 2018/0291826 A1  Oct. 11, 2018

(30) Foreign Application Priority Data

Apr. 5, 2017  (JP) .................................. 2017-075395

(51) Int. Cl.
*F02D 41/02* (2006.01)
*F02D 41/00* (2006.01)
(Continued)

(52) U.S. Cl.
CPC .......... *F02D 41/0235* (2013.01); *F02B 23/10* (2013.01); *F02B 23/101* (2013.01); *F02D 13/0223* (2013.01); *F02D 13/0226* (2013.01); *F02D 13/0257* (2013.01); *F02D 37/02* (2013.01); *F02D 41/0002* (2013.01); *F02D 41/1498* (2013.01); *F02D 41/402* (2013.01); *F02P 5/045* (2013.01); *F01N 3/10* (2013.01); *F02B 2023/103* (2013.01); *F02B 2023/108* (2013.01); *F02D 2013/0296* (2013.01); *F02D 2041/001* (2013.01);
(Continued)

(58) Field of Classification Search
CPC ............. F02D 13/0223; F02D 13/0226; F02D 13/0257; F02D 37/02; F02D 41/0002; F02D 41/0235; F02D 41/1498; F02D 41/402; F02D 2013/0296; F02D 2041/001; F02D 2041/0015; F02D 2041/389; F02P 5/045; F02B 23/10; F02B 23/101; F02B 2023/103; F02B 2023/108; F02M 61/1813; F02M 61/1826; F01N 3/10; Y02T 10/125
See application file for complete search history.

(56) References Cited

U.S. PATENT DOCUMENTS

| 2007/0079797 A1* | 4/2007 | Kihara | F02B 23/104 123/298 |
| 2010/0154761 A1* | 6/2010 | Okumura | F02B 31/085 123/676 |
| 2013/0024093 A1* | 1/2013 | Murai | F02D 41/30 701/104 |

FOREIGN PATENT DOCUMENTS

| JP | 11-280522 A | 10/1999 |
| JP | 2000-282920 A | 10/2000 |

(Continued)

*Primary Examiner* — Audrey K Bradley
(74) *Attorney, Agent, or Firm* — Sughrue Mion, PLLC

(57) ABSTRACT

When it is determined that the igniting environment is out of the desired range, the variable valve mechanism is controlled so that the swirl ratio is increased. When the swirl ratio becomes high, the discharge spark and the initial flame move largely in the flow direction of the swirl flow SW and approach the closest fuel spray. Therefore, the discharge spark and the initial flame are attracted to the closest fuel spray and the initial flame enlarges by involving the closest fuel spray (middle stage of FIG. 7). Further, the initial flame enlarges further by involving surrounded fuel spray (lower stage of FIG. 7).

3 Claims, 10 Drawing Sheets

(51) Int. Cl.
*F02D 41/14* (2006.01)
*F02D 41/38* (2006.01)
*F02D 41/40* (2006.01)
*F02D 13/02* (2006.01)
*F02B 23/10* (2006.01)
*F02P 5/04* (2006.01)
*F01N 3/10* (2006.01)
*F02D 37/02* (2006.01)
*F02M 61/18* (2006.01)

(52) U.S. Cl.
CPC ............... *F02D 2041/0015* (2013.01); *F02D 2041/389* (2013.01); *F02M 61/1813* (2013.01); *F02M 61/1826* (2013.01); *Y02T 10/125* (2013.01)

(56) References Cited

FOREIGN PATENT DOCUMENTS

| | | |
|---|---|---|
| JP | 2008-190511 A | 8/2008 |
| JP | 2009-185688 A | 8/2009 |
| JP | 2011-106377 A | 6/2011 |

\* cited by examiner

CONTROL DEVICE FOR INTERNAL COMBUSTION ENGINE

CROSS-REFERENCE TO RELATED APPLICATION

The present disclosure claims priority under 35 U.S.C. § 119 to Japanese Patent Applications No. 2017-075395, filed on Apr. 5, 2017. The contents of these applications are incorporated herein by reference in their entirety.

TECHNICAL FIELD

The present disclosure relates to a control device for an internal combustion engine, and more particularly to a control device for controlling an internal combustion engine that includes an injector and a spark plug in a combustion chamber, and also includes a catalyst (exhaust gas cleaning catalyst) that purifies exhaust gas from the combustion chamber.

BACKGROUND

JP2011-106377A discloses an engine configuration with respect to a positional relation between a spark plug and an injector disposed in a combustion chamber, and a control method by using the spark plug and the injector based on the engine configuration. In the engine configuration, a distance from a center position of a discharge gap of the spark plug to a center position of the injection hole which is closest to the spark plug and a distance from the center position of the discharge gap to a center axis of the fuel spray which is injected from the injection hole are set within a specific range, respectively.

The control method based on the engine configuration is to apply a high voltage to the spark plug over a fuel injection period after a lapse of a predetermined time from the start of fuel injection from the injector. The fuel injected from the injector under high pressure forms a low pressure part by taking away the surrounding air (entrainment). According to such control method, the low pressure part is formed to which the discharge spark generated in the discharge gap is attracted. Therefore, an ignitability of the air-fuel mixture formed around the spark plug can be improved.

In addition, JP2011-106377A discloses an activation of an exhaust gas cleaning catalyst at engine start as an application example of the attraction action described above. Although JP2011-106377A does not refer to, the activation of the exhaust gas cleaning catalyst is generally performed by setting an ignition period (that is, a discharge period of the high voltage to the spark plug) on a retard side relative to the compression top dead center. Therefore, an activation control to which an attraction action is applied means an engine control in which the fuel injection period is overlapped with the ignition period which is set on the retard side relative to the compression top dead center.

The activation control has a potential to improve an ignitability of the air-fuel mixture formed around the spark plug. However, combustion state at the engine start during which the activation control is performed is generally liable to be unstable. Therefore, when such an unstable state occurs frequently in the combustion cycles, combustion fluctuation between cycles increase to affect performance of the engine.

The present disclosure addresses the above described problem, and an object of the present disclosure is to suppress the combustion fluctuation between cycles when an engine control in which the injection period of the injector is overlapped with the discharge period of the high voltage to the spark plug is applied to the activation of the exhaust gas cleaning catalyst.

The present disclosure provides a control device for an internal combustion engine. The control device is configured to control an internal combustion engine comprising an injector, a spark plug, a first intake valve, a second intake valve, a variable valve mechanism and an exhaust cleaning catalyst.

The injector is provided in an upper portion of a combustion chamber. The injector is configured to inject fuel from multiple injection holes into a cylinder directly.

The spark plug is provided at the upper portion of the combustion chamber. The spark plug is configured to ignite an air-fuel mixture inside the cylinder by using a discharge spark. The spark plug is also provided on a downstream side relative to the closest fuel spray to the spark plug among the fuel sprays injected from the multiple injection holes. The spark plug is also provided on an upper side of the combustion chamber relative to a contour surface of the closest fuel spray.

Each of the first intake valve and the second intake valve is configured to open and close the combustion chamber.

The variable valve mechanism is configured to increase or decrease lift amount of any one of the first intake valve and the second intake valve.

The exhaust cleaning catalyst is configured to clean exhaust gas from the combustion chamber.

The control device is configured to control the spark plug and the injector as an activation control of the exhaust cleaning catalyst. In the activation control, the spark plug is controlled so as to generate the discharge spark over an ignition period on a retard side of compression top dead center whereas the injector is controlled so as to perform a first injection on an advance side of the compression top dead center and a second injection on the retard side of the compression top dead center which overlaps with at least a part of the ignition period.

The control device is also configured to control the variable valve mechanism as the activation control of the exhaust cleaning catalyst. In the activation control, the variable valve mechanism is controlled so that swirl flow due to a difference in lift amount between the first intake valve and the second intake valve is generated in the combustion chamber. When a parameter relevant to combustion fluctuation between cycles of the activation control is determined to exceed a threshold, the variable valve mechanism is also controlled so that the difference in lift amount is enlarged in comparison to a case where the parameter is determined to be less than the threshold.

When the discharge spark is generated from the spark plug, an intimal flame is generated the injected fuel of the first injection and the discharge spark. When the second injection is performed, the initial flame is attracted or both of the initial flame and the discharge spark are attracted to the closest fuel spray to the spark plug. When the attraction action of the initial flame or the discharge spark is weaken, the parameter relevant to combustion fluctuation between cycles is changed to increase. In this regard, when the difference in lift amount between the first intake valve and the second intake valve is enlarged, the swirl flow generated in the combustion chamber is enhanced. Therefore, when the parameter is determined to exceed the threshold, such a situation is eliminated by the valve control in which the swirl flow is enhanced.

In the control device for an internal combustion engine according to the present disclosure, the closest fuel spray to the spark plug may be injected on a downstream side relative to a flow direction of the swirl flow generated in the combustion chamber as viewed from the spark plug.

The spark plug is provided on the downstream side relative to the closest fuel spray to the spark plug among the fuel sprays injected from the multiple injection holes. Therefore, when the closest fuel spray to the spark plug is injected on the downstream side relative to the flow direction of the swirl flow generated in the combustion chamber as viewed from the spark plug, the initial flame or the discharge spark is efficiently attracted to the closest fuel spray to the spark plug.

In the control device for an internal combustion engine according to the present disclosure, diameter of an injection hole which is configured to inject the closest fuel spray to the spark plug may be larger than any diameter of the other injection holes which are configured to inject fuel sprays except for the closest fuel spray.

The spark plug is provided on the downstream side relative to the closest fuel spray to the spark plug among the fuel sprays injected from the multiple injection holes. Therefore, when the diameter of the injection hole which is configured to inject the closest fuel spray to the spark plug is larger than any diameter of the other injection holes, the initial flame or the discharge spark is efficiently attracted to the closest fuel spray to the spark plug.

As mentioned above, according to the control device of the present disclosure, it is possible to suppress the combustion fluctuation between cycles when the engine control in which the injection period of the injector is overlapped with the discharge period of the high voltage to the spark plug is applied to the activation of the exhaust gas cleaning catalyst.

DESCRIPTION OF EMBODIMENTS

Figure 1:
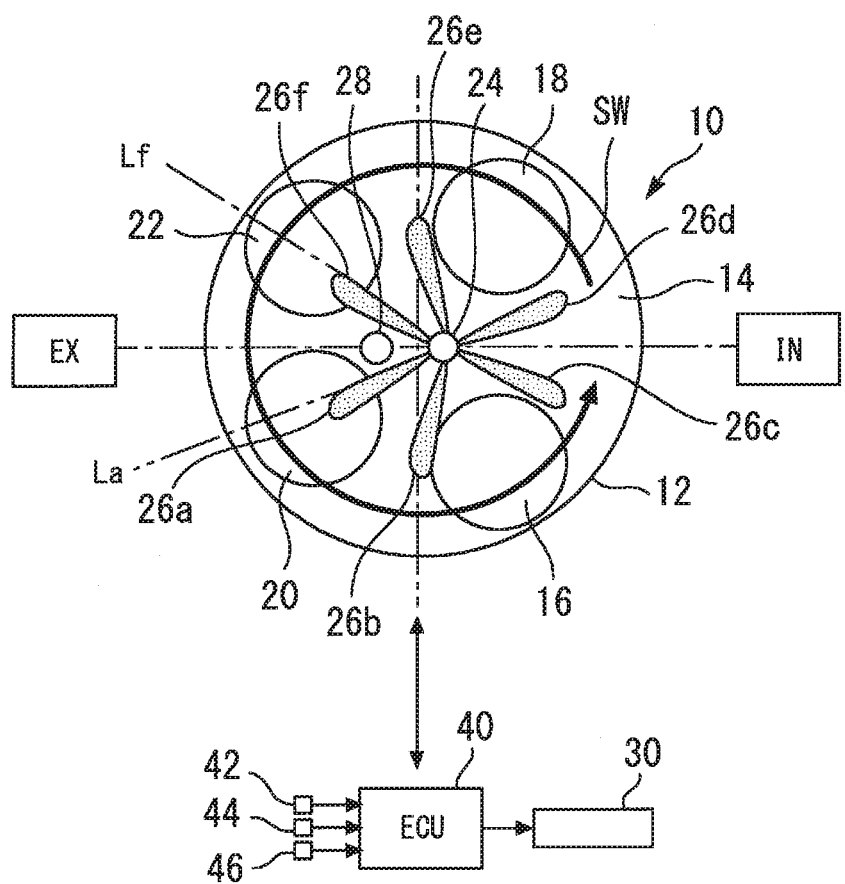
FIG. 1 is a view for describing a system configuration according to an embodiment of the present disclosure.

Hereinafter, an embodiment of the present disclosure will be described based on the accompanying drawings. Note that elements that are common to the respective drawings are denoted by the same reference characters and a duplicate description thereof is omitted. Further, the present disclosure is not limited to the embodiment described hereinafter.
[Description of System Configuration]

FIG. 1 is a view for describing the system configuration according to a first embodiment of the present disclosure. As illustrated in FIG. 1, a system according to the present embodiment includes an internal combustion engine (hereinafter also referred to as an "engine") 10 that is mounted in a vehicle. The engine 10 is a four-stroke, one-cycle engine that has a plurality of cylinders. However, only one cylinder 12 among the plurality of cylinders is depicted in FIG. 1.

In FIG. 1, a bottom surface of a cylinder head 14 is illustrated which is looked from a piston (not shown) reciprocating in the cylinder 12. The cylinder head 14 is assembled to a cylinder block (not shown). The combustion chamber of the engine 10 is defined by at least a top face of the piston, a wall face of the cylinder block, and the bottom face of the cylinder head 14. In the combustion chamber, a swirl flow SW is generated which flows around a center axis of the cylinder.

In the cylinder head 14, two intake ports and two exhaust ports which communicate with the combustion chamber are formed. At each of opening portions of the intake ports, intake valves 16 and 18 are provided, respectively. The reason why the swirl flow SW is generated in the combustion chamber is that there is a difference in lift amount of the intake valves 16 and 18. The difference in the lift amount is controlled by a variable valve mechanism 30. When the difference in the lift amount is changed by an engine control in which the lift amounts or operation angles of the intake valves 16 and 18 are controlled by the variable valve mechanism 30, swirl ratio is changed. The swirl ratio is defined as a ratio of rotation speed of the swirl from SW and engine rotation speed. The swirl ratio represents an index relative strength of the swirl flow SW. At each of opening portions of the exhaust ports, exhaust valves 20 and 22 are provided, respectively.

An injector 24 is provided substantially at the center of the cylinder head 14. The injector 24 is connected to a fuel supply system which includes a fuel tank, a common rail and a supply pump. At a tip of the injector 24, a plurality of injection holes (specifically six injection holes) are radially formed. When the injection holes are opened, fuel in a high pressure state is injected from each injection hole. The fuel sprays 26a to 26f illustrated in FIG. 1 schematically show the fuel injected form the injection holes of the injector 24.

A spark plug 28 is also provided substantially at the center of the cylinder head 14. The spark plug 28 has an electrode portion (not shown) at tip thereof. The electrode portion is composed of a center electrode and a ground electrode. In FIG. 1, the spark plug 28 is located on a downstream side in the injection direction of the fuel sprays 26a and 26f. The spark plug 28 is located approximately midway between an extension line La of the injection hole for the fuel spray 26a and an extension line Lf of the injection hole for the fuel spray 26f. The fuel spray 26a or 26f passes near the electrode portion. However, a protruding amount of the spark plug 28 from the cylinder head 14 is adjusted so that the fuel spray 26a or 26f does not contact with the electrode portion. Specifically, the protruding amount is adjusted so that the spark plug 28 is located over an outer surface of the fuel spray 26a or 26f. In other words, the position of the spark plug 28 is adjusted so that the electrode portion is located nearer to bottom surface of the cylinder head 14 than the outer surface of the sprays 26a and 26f.

Further, as illustrated in FIG. 1, the system according to the embodiment includes an ECU (Electronic Control Unit) 40 as a control device. The ECU 40 includes a RAM (Random Access Memory), a ROM (Read Only Memory), a CPU (Central Processing Unit) and the like. The ECU 40 is configured to capture signals from various sensors that are mounted on the vehicle. The ECU 40 is also configured to process signals from the various sensors and control various actuators in accordance with predetermined control programs.

The various sensors include at least a pressure sensor 42, a crank angle sensor 44 and a temperature sensor 46. The pressure sensor 42 is provided at the upper portion of the combustion chamber. The pressure sensor 42 is configured to detect pressure in the combustion chamber. The crank angle sensor 44 is provided in vicinity of the crankshaft. The crank angle sensor 44 is configured to detect rotation angle of the crankshaft. The temperature sensor 48 is provided at a cooling water passage of the engine 10. The temperature sensor 48 is configured to detect temperature of cooling water of the engine 10. The various actuators include at least the injector 24, the spark plug 28 and the variable valve mechanism 30 described above.

[Startup Control by ECU 40]

In the embodiment, the ECU 40 performs control that promotes activation of an exhaust gas cleaning catalyst (hereinafter also referred to as "catalyst warm-up control") immediately after a cold startup of the engine 10. The exhaust gas cleaning catalyst is a catalyst that is provided in an exhaust passage of the engine 10. One example of the exhaust gas cleaning catalyst, a three-way catalyst is mentioned. The three-way catalyst is a catalyst which purifies nitrogen oxides (NOx), hydrocarbon (HC) and carbon monoxide (CO) contained in exhaust gas when atmosphere of the catalyst being in an activated state is in vicinity of stoichiometry.

Figure 2:
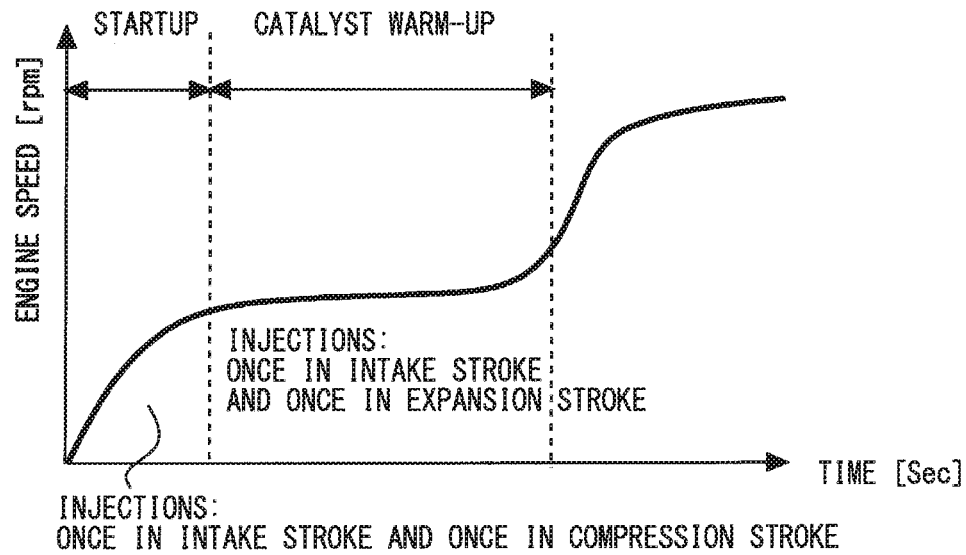
FIG. 2 is a view for illustrating an example of a fuel injection pattern immediately after startup of the engine 10 shown in FIG. 1.

The catalyst warm-up control will now be described referring to FIGS. 2 to 4. FIG. 2 illustrates an example of a fuel injection pattern immediately after a cold startup of the engine 10. As illustrated in FIG. 2, a fuel injection pattern in which an injection in an intake stroke (hereinafter also referred to as an "intake stroke injection") and an injection in a compression stroke (hereinafter also referred to as a "compression stroke injection") are combined is adopted immediately after startup. Thereafter, accompanying an increase in the engine speed, the compression stroke injection is switched to an injection in an expansion stroke (hereinafter also referred to as an "expansion stroke injection") so as to start the catalyst warm-up control. That is, in the catalyst warm-up control, a fuel injection pattern that combines the intake stroke injection and the expansion stroke injection is adopted. Note that the intake stroke injection which is common to the fuel injection patterns mentioned above may be performed twice or more.

Figure 3:
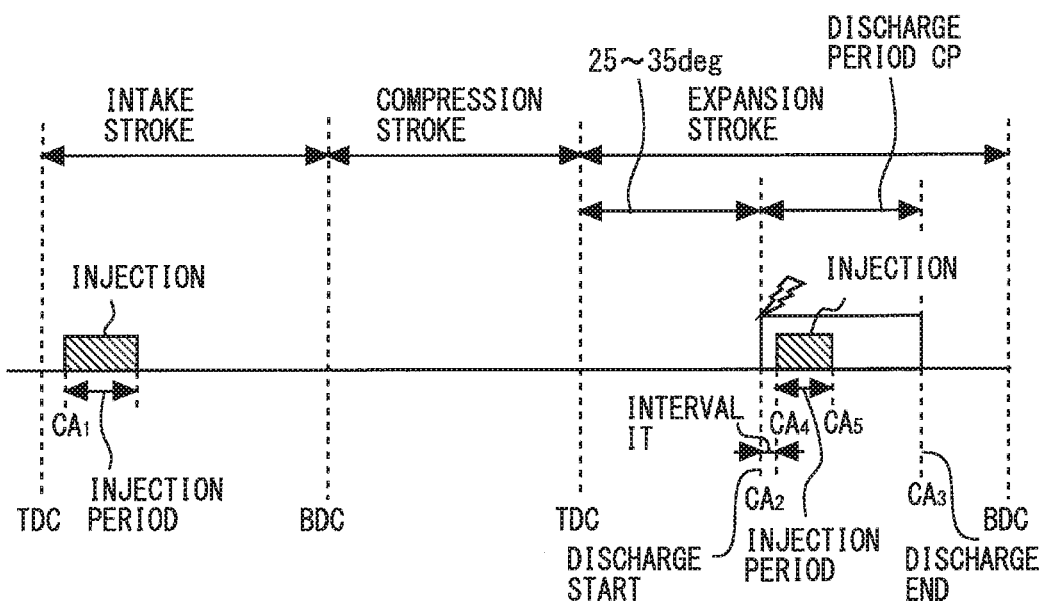
FIG. 3 is a view for illustrating injection start timings, injection periods and a discharge period at an electrode portion during catalyst warm-up control.
Figure 4:
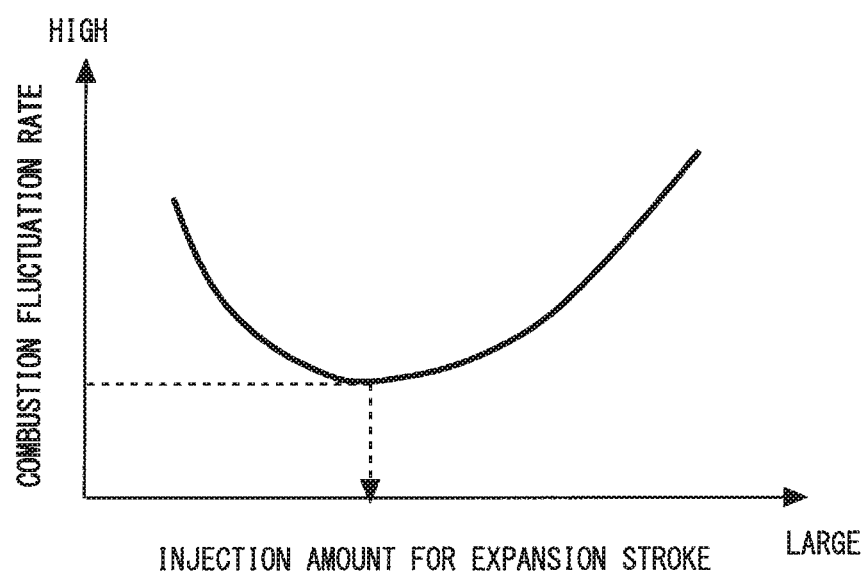
FIG. 4 is a view for illustrating a relation between a combustion fluctuation rate and a fuel injection amount for an expansion stroke injection.

FIG. 3 illustrates injection start timings, injection periods, and a discharge period at the electrode portion during the catalyst warm-up control. As illustrated in FIG. 3, the intake stroke injection is started at a crank angle $CA_1$ (as one example, in vicinity of BTDC 280°). A discharge period CP at the electrode portion is set retard side rather than compression top center. This is because that temperature of the exhaust gas is increased when the discharge period CP is set retard side rather than compression top center. The expansion stroke injection is performed during the discharge period CP. Specifically, the discharge period CP is from a crank angle $CA_2$ (as one example, in vicinity of ATDC 25 to 35°) to a crank angle $CA_3$. The expansion stroke injection is started at a crank angle $CA_4$ on a retard side rather than the crank angle $CA_2$ and is ended at a crank angle $CA_5$ on an advance side rather than the crank angle $CA_3$.

In FIG. 3, an interval IT is set between the crank angle $CA_2$ and crank angle $CA_4$. However, the interval IT may be zero. In other words, the crank angle $CA_2$ and the crank angle $CA_4$ may coincide. Further, the interval IT may be a negative value. That is, the crank angle $CA_4$ may be located on an advance side relative to the crank angle $CA_2$. The relation between the crank angle $CA_2$ and the crank angle $CA_4$ also holds between the crank angle $CA_3$ and the crank angle $CA_5$. Specifically, the crank angle $CA_3$ and the crank angle $CA_5$ may coincide. Further, the crank angle $CA_5$ may be located on an advance side relative to the crank angle $CA_3$. The crank angles $CA_2$, $CA_3$, $CA_4$ and $CA_5$ may be changed as long as at least a part of the injection period of the expansion stroke injection overlaps with the discharge period CP. This is because that when at least the part of the injection period of the expansion stroke injection overlaps with the discharge period CP, the attraction action to be described later is expected.

The injection period of the expansion stroke injection is set based on a relation between a fuel injection amount for the expansion stroke injection and a combustion fluctuation rate. An example of this relation is illustrated in FIG. 4. As illustrated in FIG. 4, a combustion fluctuation rate obtained under equivalent operating conditions as the operating conditions during the catalyst warm-up control has a downwardly convex shape within a specific fuel injection amount range. The injection period of the expansion stroke injection is set as an injection period corresponding to a fuel injection amount when the combustion fluctuation rate becomes smallest (as one example, about 5 mm³/st).

[Catalyst Warm-up Control Utilizing Attraction Action and Issue Relating thereto]

Figure 5:
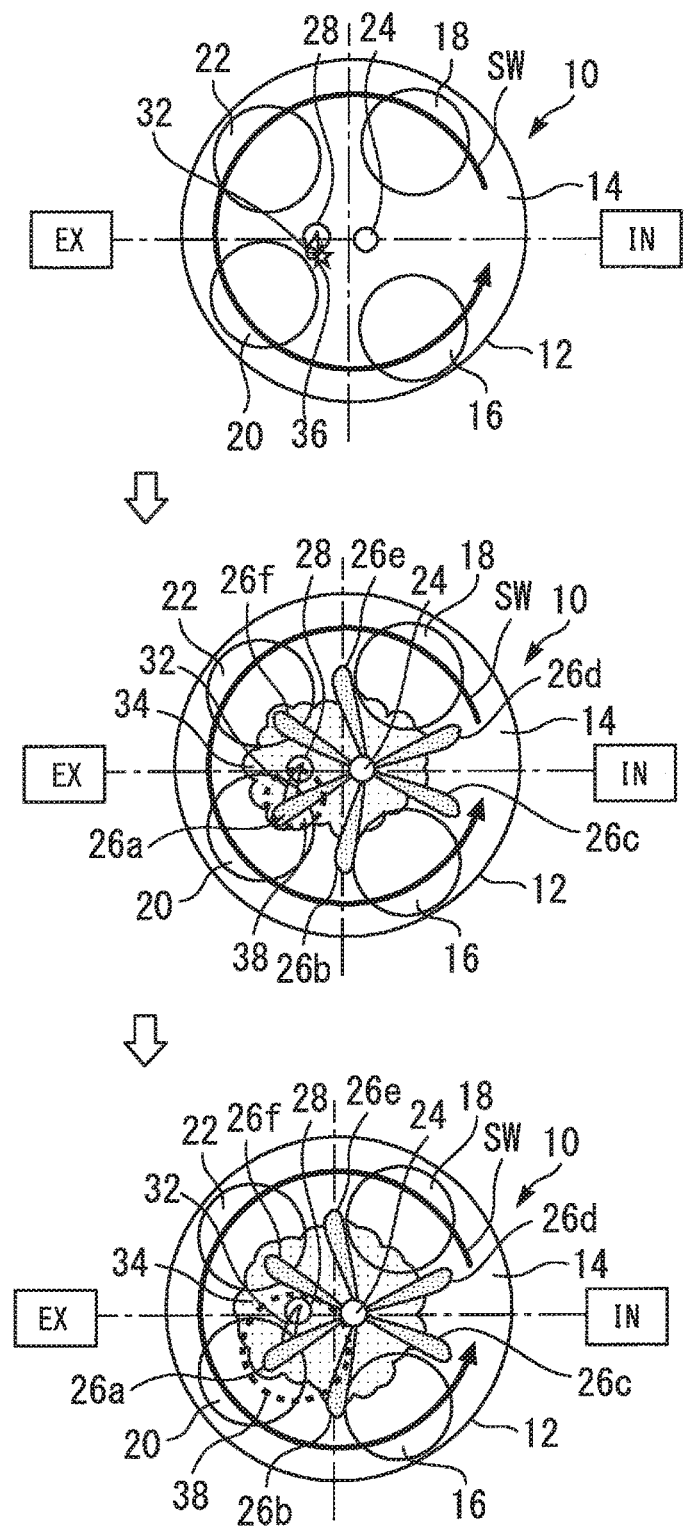
FIG. 5 is a view for describing an attraction action caused by the expansion stroke injection.

FIG. 5 is a view for describing the attraction action caused by the expansion stroke injection. In an upper stage of FIG. 5, in-cylinder state during the discharge period of the electrode portion and immediately before the expansion stroke injection is illustrated. As shown in the upper stage, during the discharge period of the electrode portion, flame kernel 36 is generated from a discharge spark 32 at the spark plug 28 and homogeneous air-fuel mixture. The homogeneous air-fuel mixture is a mixture from fuel spray due to the intake stroke injection. As shown in the upper stage, the discharge spark 32 extends in a flow direction of the swirl flow SW. In addition, the flame kernel 36 flows in the flow direction of the swirl flow SW.

In a middle stage of FIG. 5, the in-cylinder state immediately after the expansion stroke injection is illustrated. As shown in the middle stage, when the expansion stroke injection is performed, the fuel sprays 26a to 26f from the injector 26 form stratified air-fuel mixture 34 around the spark plug 28. The stratified air-fuel mixture 34 is air-fuel mixture being higher in fuel concentration than the homogeneous air-fuel mixture which exist around the stratified air-fuel mixture 34. Around each of the fuel sprays 26a to 26f, a low pressure part is formed respectively (entrainment). Then, the discharge spark 32 and the initial flame 38 generated from the flame kernel 36 are attracted to the closest fuel spray (more precisely the fuel spray 26a). As a result, the initial flame 38 is enlarged by involving the fuel spray 26a. In a lower stage of FIG. 5, the in-cylinder state slightly after the in-cylinder state shown in the middle stage is illustrated. As shown in the lower stage, the initial flame 38 is enlarged more by involving the stratified air-fuel mixture 34 in the vicinity of the fuel spray 26a. In this manner, according to the attraction action by the expansion stroke injection, it is possible to stabilize combustion (hereinafter also referred to as "initial combustion") for growing the initial flame 38 generated from the homogeneous air-fuel mixture.

In the meantime, if an igniting environment of the engine 10 is changed due to some factors and therefore is out of a desired range, a combustion state may become unstable in spite of the attraction action by the expansion stroke injection. For example, when the protruding amount of the spark plug 28 from the cylinder head 14 is changed due to an exchange of the spark plug 28 to a new one, a distance between the electrode portion and the outer surface of the closest fuel spray to the discharge spark and the initial flame (that is, the fuel spray 26a) is enlarged. When spray angle is changed due to deposition of deposits on the injection holes of the injector 24, the similar problem in the distance between the electrode portion and the outer surface of the closest fuel spray occurs.

Figure 6:
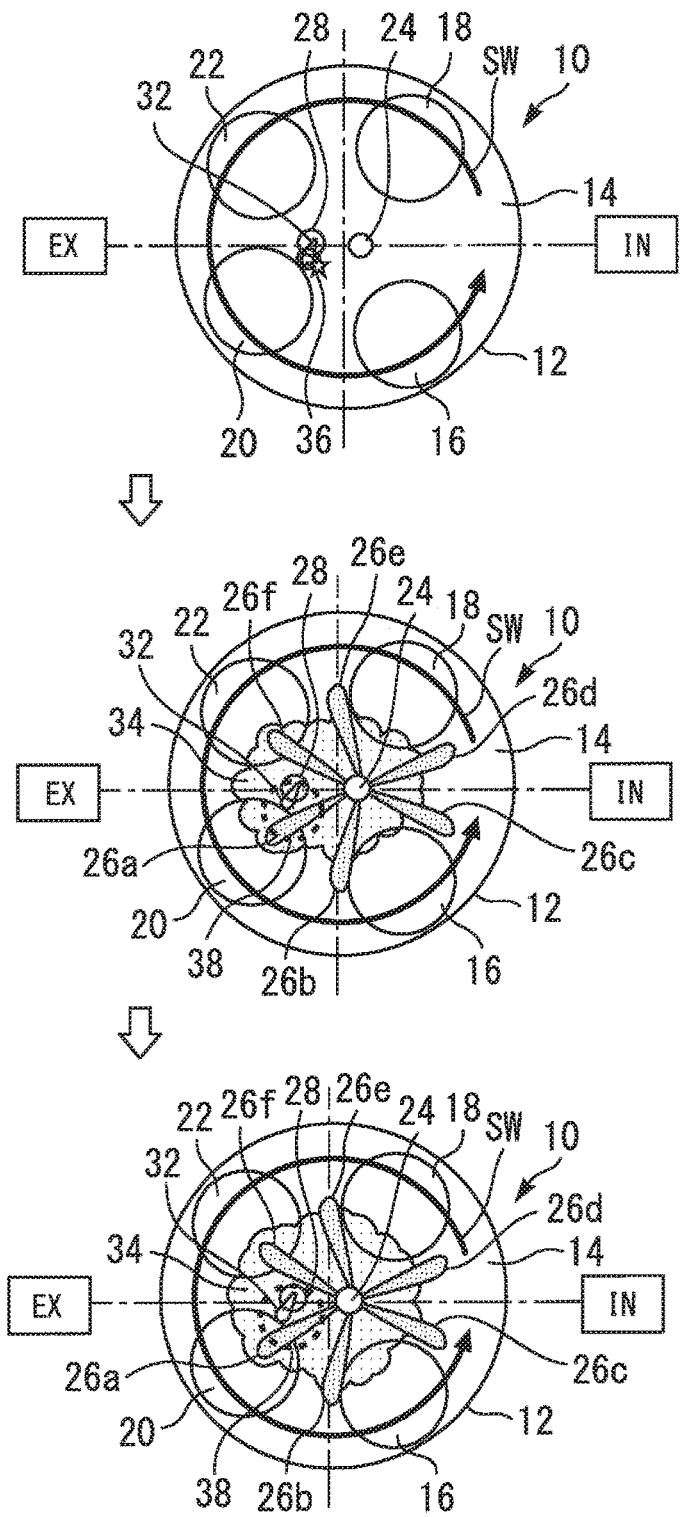
FIG. 6 is a view for describing a problem when distance between an outer surface of fuel spray 26a shown in FIG. 1 and the electrode portion is enlarged.

FIG. 6 is a view for describing a problem when the distance between the outer surface of the fuel spray 26a and the electrode portion is enlarged. In-cylinder states shown in an upper stage, a middle stage and a lower stage of FIG. 6 corresponds to the in-cylinder states shown in the upper stage, the middle stage and the lower stage of FIG. 5, respectively. Note that the in-cylinder state of each stage is substantially the same at the crank angle.

The in-cylinder state illustrated in the upper stage of FIG. 6 is the same as the in-cylinder state described with reference to the upper stage of FIG. 5. In contrast to this, as can be understood by comparing the middle stages or the lower stages of FIGS. 5 and 6, range of the initial flame 38 shown in FIG. 6 becomes narrower than that shown in FIG. 5. This is because that the attraction action due to the expansion stroke injection is weakened by the enlargement in the distance mentioned above. When the attraction action is weakened, the initial combustion speed decreases. Then, such a speed reduction occurs frequently in the combustion cycles, combustion fluctuation between cycles increase to affect performance of the engine.

[Characteristics of Catalyst Warm-up Control]

Figure 7:
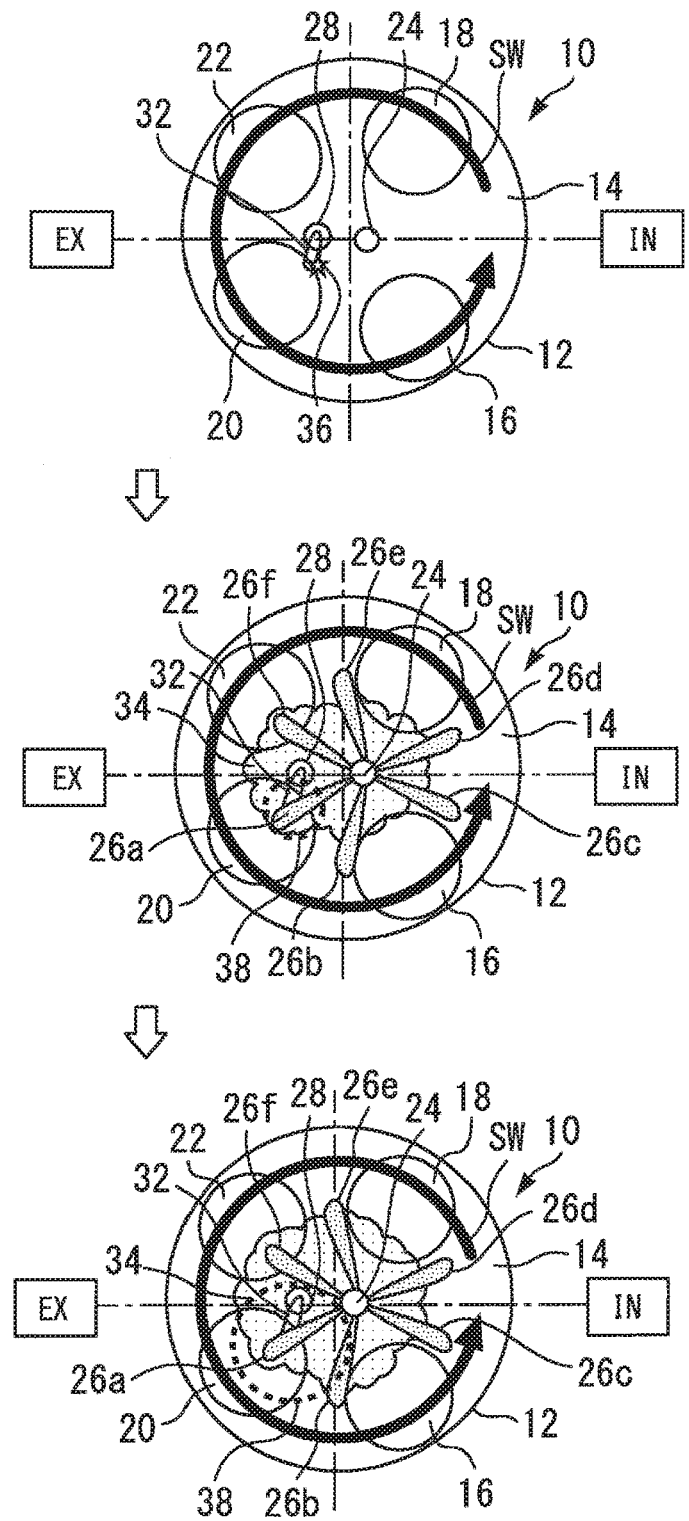
FIG. 7 is a view for illustrating an outline of the catalyst warm-up control of the embodiment of the present disclosure.

Therefore, in the present embodiment, a determination is made during the catalyst warm-up control with respect to change in the igniting environment. And when it is determined that the igniting environment is out of the desired range, the variable valve mechanism is controlled so that the swirl ratio is increased. FIG. 7 is a view for illustrating an outline of the catalyst warm-up control of the embodiment. In-cylinder states shown in an upper stage, a middle stage and a lower stage of FIG. 7 corresponds to the in-cylinder states shown in the upper stage, the middle stage and the lower stage of FIG. 6, respectively. Note that the in-cylinder state of each stage is substantially the same at the crank angle.

As can be understood by comparing FIGS. 6 and 7, the swirl flow SW shown in each stages of FIG. 7 is drawn thicker than the swirl flow SW shown in each stages of FIG. 6. This means that the swirl ratio of the swirl flow SW shown in each stages of FIG. 7 is higher than that of the swirl flow SW shown in each stages of FIG. 6. When the swirl ratio becomes high, the discharge spark 32 and the initial flame 38 move largely in the flow direction of the swirl flow SW. Also, the fuel sprays 26a to 26f move largely in the flow direction as the swirl ratio becomes high.

However, the fuel sprays 26a to 26f are injected at high pressure. Therefore, in comparison to the discharge spark 32 and the initial flame 38, the injected fuel sprays are hard to be swept by the swirl flow SW. Accordingly, when the swirl ratio becomes high, the discharge spark 32 and the initial flame 38 approach the closest fuel spray (the fuel spray 26a). That is, a distance between the discharge spark and the closest fuel spray or a distance between the initial flame and the closest fuel spray is shorten.

Therefore, as shown in the middle stage of FIG. 7, the discharge spark 32 and the initial flame 38 are attracted to the fuel spray 26a and the initial flame 38 enlarges by involving the fuel spray 26a. Further, as shown in the lower stage of FIG. 7, the initial flame 38 enlarges further by involving surrounded fuel spray (the fuel spray 26b). In this way, when the swirl ratio is increased by the control of the variable valve mechanism, it is possible to improve the igniting environment and prevent the initial combustion from becoming unstable.

Whether or not the igniting environment is out of the desired range is determined based on a SC-CA 10. The SC-CA 10 is defined as a crank angle period from a starting point of the initial combustion (crank angle CA0) which starts behind a starting point of an ignition timing (that is, the discharge start timing at the electrode portion) to a combustion point in which mass fraction burned (MFB) reaches 10% (crank angleCA10). Note that, the MFB is calculated based on a result of analyzing in-cylinder pressure data that is obtained utilizing the in-cylinder pressure sensor 42 and the crank angle sensor 44, and SA-CA10 is calculated based on the calculated MFB. A method for calculating MFB based on the analysis result and a method for calculating the SA-CA10 based on the calculated MFB are described in detail in, for example, JP 2015-094339 A and JP 2015-098799 A, and hence a description thereof is omitted from the present description.

Figure 8:
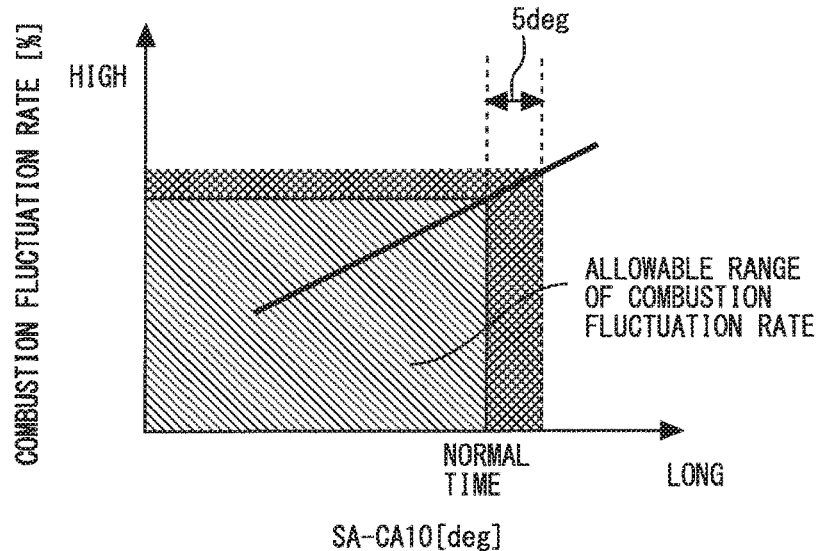
FIG. 8 is a view illustrating a relation between the combustion fluctuation rate and SA-CA 10.

As understood from the definition of the SC-CA 10, the fact that a value of the SC-CA 10 is small means that a period from MFB 0% to 10% is short. Conversely, if the value of the SC-CA 10 is large, it means that the period from MFB 0% to 10% is long. FIG. 8 is a view illustrating a relation between the combustion fluctuation rate and SA-CA10. As shown in FIG. 8, when the SC-CA 10 becomes longer, the combustion fluctuation rate becomes larger and exceeds an allowable range.

In the catalyst warm-up control of the embodiment of the present disclosure, it is determined that the initial combustion speed is slow when the SA-CA10 that is actually calculated (hereunder, also referred to as "actual SA-CA10") is longer than the SA-CA10 at a normal time by a predetermined crank angle period (as one example, 5°) or more. Note that, the SA-CA10 at the normal time is are set in advance by adaptation.

[Specific Processing]

Figure 9:
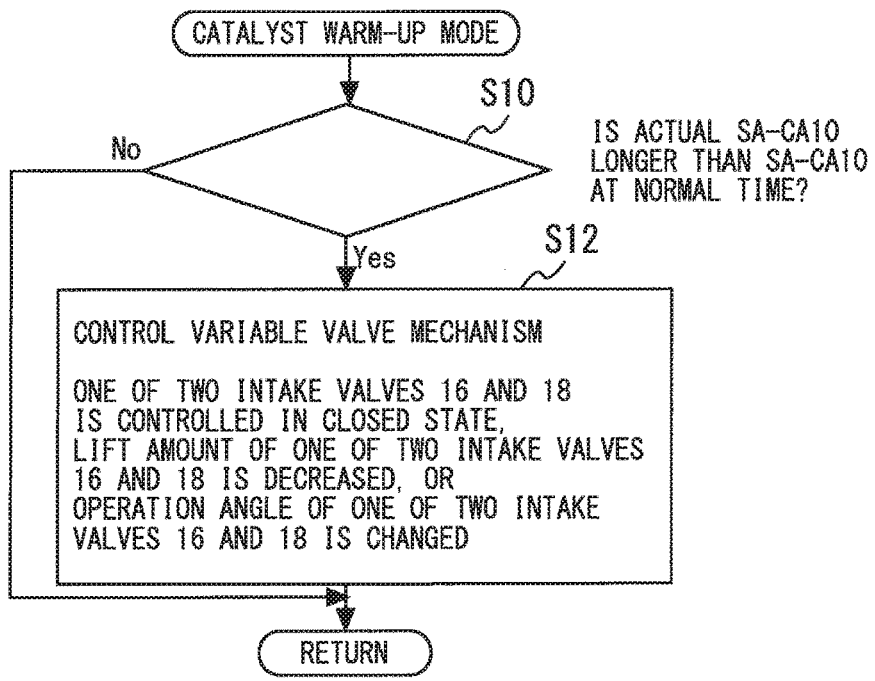
FIG. 9 is a flowchart for illustrating an example of processing that an ECU executes in the embodiment of the present disclosure.

FIG. 9 is a flowchart for illustrating an example of processing that an ECU executes in the embodiment of the present disclosure. Note that the routine shown in FIG. 9 is repeatedly executed during a period in which an operation mode that executes the catalyst warm-up control (hereinafter also referred to as "catalyst warm-up mode") is selected.

In the routine illustrated in FIG. 9, first, it is determined whether or not the actual SA-CA10 is longer than the SA-CA10 at the normal time by the predetermined crank angle period or more (step S10). In the step S10, the actual SA-CA10 that is calculated separately in the ECU 40 is acquired, and the calculated actual SA-CA10 is compared with the SA-CA10 at the normal time. When the determination result of the step S10 is negative, it is determined that there is no particular problem in the igniting environment. Therefore, in this case, the ECU 40 exits the present routine.

On the other hand, when the determination result of the step S10 is positive, it is determined that the igniting environment has changed to go out of the desired range. Therefore, in this case, the ECU 40 controls the variable valve mechanism (step S12). In the step S12, for example, one of the two intake valves (that is, the intake valves 16 and 18 shown in FIG. 1) is controlled in a closed state so that the difference between the lift amounts of the two intake valves is enlarged. Alternatively, the lift amount of one of the intake valves is decreased so that the difference between the lift amounts of the two intake valves is enlarged. Alternatively, so that the operation angle of one of the intake valves is changed so that the difference between the lift amounts of the two intake valves is enlarged.

As described above, according to the routine illustrated in FIG. 9, during the catalyst warm-up mode is selected, the change in the igniting environment is determined based on the actual SC-CA 10. Further, according to the routine illustrated in FIG. 9, when it is determined that the igniting environment has changed to go out of the desired range, the difference between the lift amounts of the two intake valves is enlarged and thus the swirl ratio is increased. Therefore, it is possible to improve the igniting environment during the catalyst warm-up mode and also prevent the initial combustion from unstable.

Note that in the embodiment of the present disclosure, the intake valves 16 and 18 correspond to "the first intake valve" and "the second intake valve" of the control device for an internal combustion engine. The intake stroke injection executed during the catalyst warm-up control corresponds to the "first injection" of the control device for an internal combustion engine. The expansion stroke injection executed during the catalyst warm-up control corresponds to the "second injection" of the control device for an internal combustion engine.

Other Embodiments

In the embodiment mentioned above, the change in the igniting environment is determined by using the SC-CA 10. However, the determination may be executed by using a variation (a standard deviation) of Gat 30 in spite of using the SC-CA 10. A rotor of the crank angle sensor 44 is provided with teeth having intervals of 30°. The crank angle sensor 44 is configured to transmit a signal every time the crankshaft rotates by 30°. The Gat 30 is calculated as a time between signals to be transmitted, that is, a time required to rotate the crankshaft by 30°.

Figure 10:
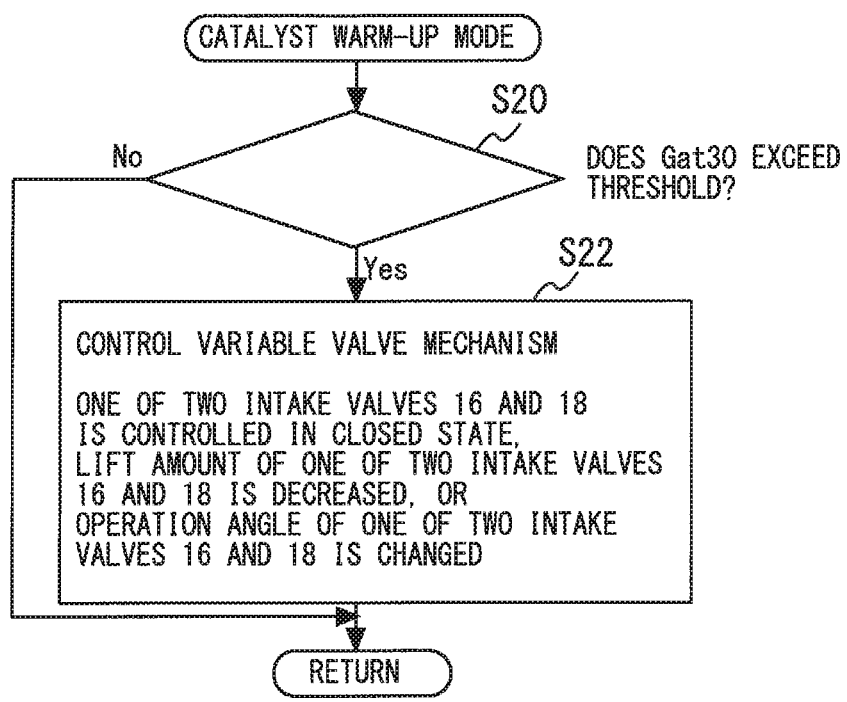
FIG. 10 is a flowchart for illustrating an example of processing that the ECU executes in an alternative embodiment of the present disclosure.

FIG. 10 is a flowchart for illustrating an example of processing that the ECU executes in an alternative embodiment of the present disclosure. In the routine illustrated in FIG. 10, first, it is determined whether or not the Gat 30 exceeds a threshold (a set value) (step S20). When the determination result of the step S20 is negative, it is determined that there is no particular problem in the igniting environment. Therefore, in this case, the ECU exits the present routine. On the other hand, when the determination result of the step S20 is positive, it is determined that the igniting environment has changed to go out of the desired range. Therefore, in this case, the ECU controls the variable valve mechanism (step S22). The processing in the step S22 is the same as the processing in the step S12 shown in FIG. 9.

Furthermore, not limited to the Gat 30 and the SC-CA 10, a time required to rotate the crankshaft by 60° (Gat 60), a crank angle period from the start of the ignition period until the MFB reaches 5% (SA-CA5), or a crank angle period from the start timing of the ignition period until the MFB reaches 15% (SA-CA15) may be used. As mentioned above, any parameter having a correlation with the initial combustion speed can be used for the determination regarding the change in the ignition environment.

In the embodiment mentioned above, an example is illustrated in FIG. 1 in which the injector 24 has injection holes for injecting the fuel sprays 26a to 26f. However, various modifications are available for the injection holes of the injector 24.

Figure 11:
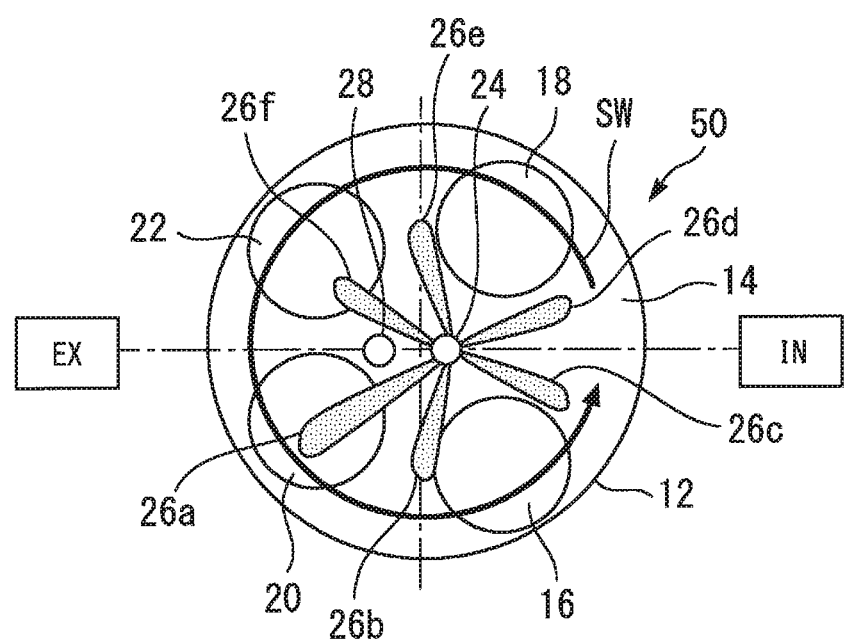
FIG. 11 is a view for describing a configuration of an engine 50 whose injection hole for injecting the fuel spray 26a shown in FIG. 1 is different in diameter from that of the engine 10 shown in FIG. 1.

FIG. 11 is a view for describing a configuration of an engine 50 whose injection hole for injecting the fuel spray 26a shown in FIG. 1 is different in diameter from that of the engine 10 shown in FIG. 1. Like FIG. 1, FIG. 11 illustrates the bottom surface of a cylinder head 14 which is looked from the piston (not shown) reciprocating in the cylinder 12. A feature of the engine 50 is that diameter of the injection hole for injecting the fuel spray 26a is larger than diameter of the injection holes for the other fuel sprays 26b to 26f. As already described, the closest fuel spray 26a has a large influence on the attraction action of the discharge spark and the initial flame. Therefore, when the diameter of the injection hole for injecting the fuel spray 26a is increased, the attraction action can be strengthened. Therefore, according to the configuration of the engine 50, as compared with the configuration of the engine 10, it is possible to enhance the resistance to change in the igniting environment.

Figure 12:
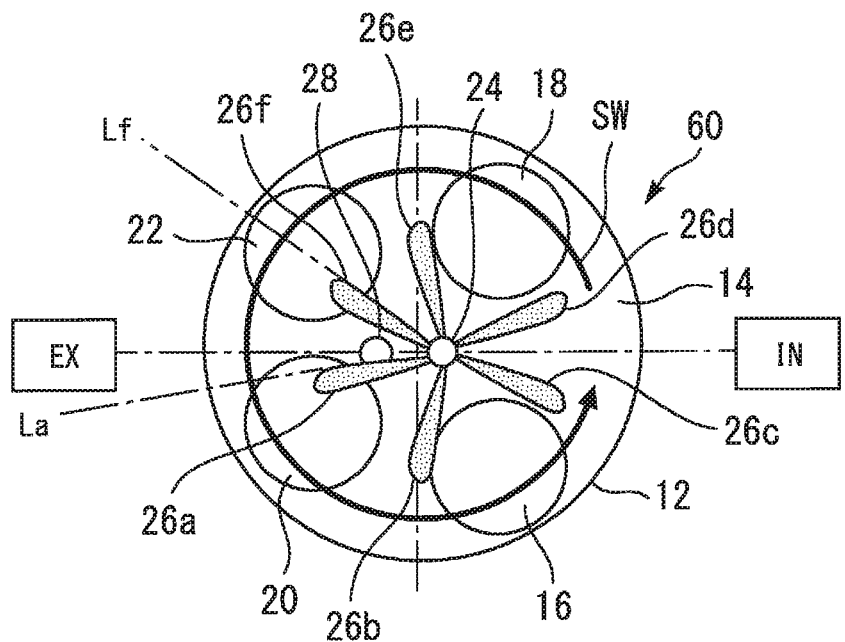
FIG. 12 is a view for describing a configuration of an engine 60 whose injection hole for injecting the fuel spray 26a shown in FIG. 1 is different in position from that of the engine 10 shown in FIG. 1.

FIG. 12 is a view for describing a configuration of an engine 60 whose injection hole for injecting the fuel spray 26a shown in FIG. 1 is different in position from that of the engine 10 shown in FIG. 1. Like FIG. 1, FIG. 12 illustrates the bottom surface of a cylinder head 14 which is looked from the piston (not shown) reciprocating in the cylinder 12. A feature of the engine 60 is that the extension line La is shifted to the upstream side in the flow direction of the swirl flow SW rather than the extension line La shown in FIG. 1. With this movement of the extension line La, a distance between the discharge spark and the injector 24 or a distance between the initial flame and the injector 24 is shortened. Therefore, according to the configuration of the engine 60, the attraction action can be strengthened and thus, it is possible to enhance the resistance to change in the igniting environment.

Figure 13:
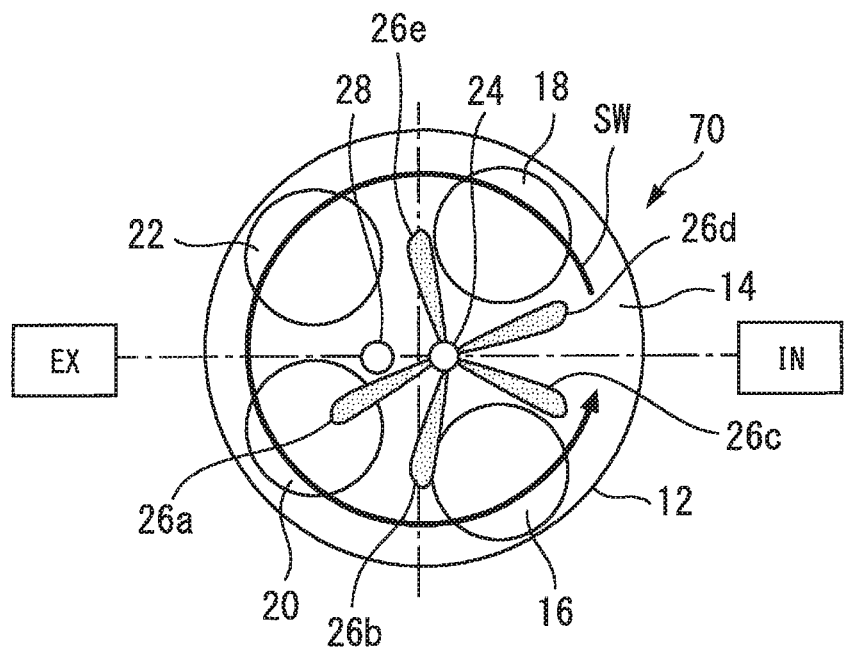
FIG. 13 is a view for describing a configuration of an engine 70 whose injection hole for injecting the fuel spray 26a shown in FIG. 1 is different in number from that of the engine 10 shown in FIG. 1.

FIG. 13 is a view for describing a configuration of an engine 70 whose injection hole for injecting the fuel spray 26a shown in FIG. 1 is different in number from that of the engine 10 shown in FIG. 1. Like FIG. 1, FIG. 13 illustrates the bottom surface of a cylinder head 14 which is looked from the piston (not shown) reciprocating in the cylinder 12. A feature of the engine 70 is that five injection holes are formed at the tip of the injector 24. As can be understood by comparing FIG. 1 with FIG. 13, there is no injection hole for injecting the fuel spray 26f in FIG. 13. However, the injection hole for injecting the fuel spray 26a is formed in FIG. 13 as well as in FIG. 1. Therefore, the attraction of the discharge spark and initial flame illustrated in FIG. 5 occurs in the engine 70 in the same manner. In this way, the number of the injection holes of the injector 24 can be changed as long as the spark plug 28 is provided on the downstream side in the injection direction for the closest fuel spray such as the fuel spray 26*a*.

What is claimed is:

1. A control device for an internal combustion engine which is configured to control an engine, the engine comprising:
  an injector which is provided in an upper portion of a combustion chamber and is configured to spray fuel from multiple injection holes into a cylinder directly;
  a spark plug which is provided at the upper portion of the combustion chamber and is configured to ignite an air-fuel mixture inside the cylinder by using a discharge spark, the spark plug is also provided on a downstream side relative to the closest fuel spray to the spark plug among the fuel sprays injected from the multiple injection holes, the spark plug is also provided on an upper side of the combustion chamber relative to a contour surface of the closest fuel spray;
  a first intake valve and a second intake valve, each of which is configured to open and close the combustion chamber;
  a variable valve mechanism which is configured to increase or decrease lift amount of any one of the first intake valve and the second intake valve; and
  an exhaust cleaning catalyst which is configured to clean exhaust gas from the combustion chamber;

the control device comprising:
  programming to control the spark plug and the injector as an activation control of the exhaust cleaning catalyst, the spark plug is controlled so as to generate a discharge spark over an ignition period on a retard side of compression top dead center whereas the injector is controlled so as to perform a first injection on an advance side of the compression top dead center and a second injection on the retard side of the compression top dead center which overlaps with at least a part of the ignition period, and
  programming to control the variable valve mechanism as the activation control of the exhaust cleaning catalyst, the variable valve mechanism is controlled so that swirl flow due to a difference in lift amount between the first intake valve and the second intake valve is generated in the combustion chamber, the variable valve mechanism is also controlled so that the difference in lift amount is enlarged when a parameter relevant to combustion fluctuation between cycles of the activation control is determined to exceed a threshold in comparison to a case where the parameter is determined to be less than the threshold.

2. The control device for an internal combustion engine according to claim 1,
  wherein the closest fuel spray to the spark plug is injected on a downstream side relative to a flow direction of the swirl flow generated in the combustion chamber as viewed from the spark plug.

3. The control device for an internal combustion engine according to claim 1,
  wherein a diameter of an injection hole which is configured to inject the closest fuel spray to the spark plug is larger than any diameter of the other injection holes which are configured to inject fuel spray except for the closest fuel.

* * * * *